United States Patent

[11] 3,540,736

[72] Inventor Alan Pallie
Silver Spring, Maryland (110 MacDougal St. New York, NY 10012)

[21] Appl. No. 762,483
[22] Filed Sept. 25, 1968
[45] Patented Nov. 17, 1970

[54] SAFETY PROTECTIVE DISCS FOR PHONOGRAPH RECORDS
1 Claim, 5 Drawing Figs.

[52] U.S. Cl. ........ 274/1, 274/42
[51] Int. Cl. ........ G11b
[50] Field of Search ........ 274/13-1, 41.1, 42, 42P

[56] References Cited
UNITED STATES PATENTS

| | | | |
|---|---|---|---|
| 1,881,110 | 10/1932 | Acheson | 274/42 |
| 1,952,054 | 3/1934 | Black | 274/42 |

*Primary Examiner*—Leonard Forman
*Assistant Examiner*—A.J. Mirabito
*Attorney*—Sherman Levy

ABSTRACT: Safety protective discs which are of a material somewhat softer than that normally used, such as soft plastic. The discs are placed between adjacent stacked records, and have a silent fast groove therein, preventing the records from contacting each other whereby damage to the phonograph records is prevented.

INVENTOR
ALAN PALLIE

BY Sherman Levy
ATTORNEY

SAFETY PROTECTIVE DISCS FOR PHONOGRAPH RECORDS

BACKGROUND OF THE INVENTION

1. Field of the Invention

The present invention pertains to the field of sound recording and reproducing as defined in class 274, subclass 42.

2. Description of the Prior Art

The prior art includes the following prior U.S. Pat. Nos.: 877,842; 1,468,879; 2,906,536; 3,051,496; 3,169,023.

Some of the differences or advantages that the present invention has over these prior patents are as follows:

The discs of the present invention have the same shape and configuration as regular or conventional long-playing phonograph records, and the discs are compatible with all record changers. Also, the discs of the present invention will not cause damage to the phonograph records, and the protective discs may have a different color such as a milky white appearance for identification purposes. The protective discs of the present invention are adapted to be made of a material that is somewhat softer than the vinyl commonly used in the manufacture of phonograph records which will not damage the stylus, and wherein the discs have only one groove leading to the center so as to permit the rejection mechanism to function in a very short period of time.

SUMMARY OF THE INVENTION

In accordance with the present invention, there is provided safety protective discs for phonograph records which are in the nature of protective accessories for records such as standard 12 inch 33⅓ r.p.m. records, and wherein the discs can be used with various types of automatic record changers. The discs function as safety devices to permit phonograph records to be safely handled and stacked on a phonograph record changer spindle, and wherein the phonograph records can be removed from the spindle after the records have been played in such a manner that the phonograph records will not contact each other, and this therefore eliminates the possibility of the records becoming damaged by rubbing or scratching together. It is to be noted that one of the safety discs of the present invention is adapted to be inserted between each pair of conventional phonograph records when the records are placed on the turntable spindle.

DESCRIPTION OF THE PREFERRED EMBODIMENTS

Figures 1, 2, 3, 4, 5:
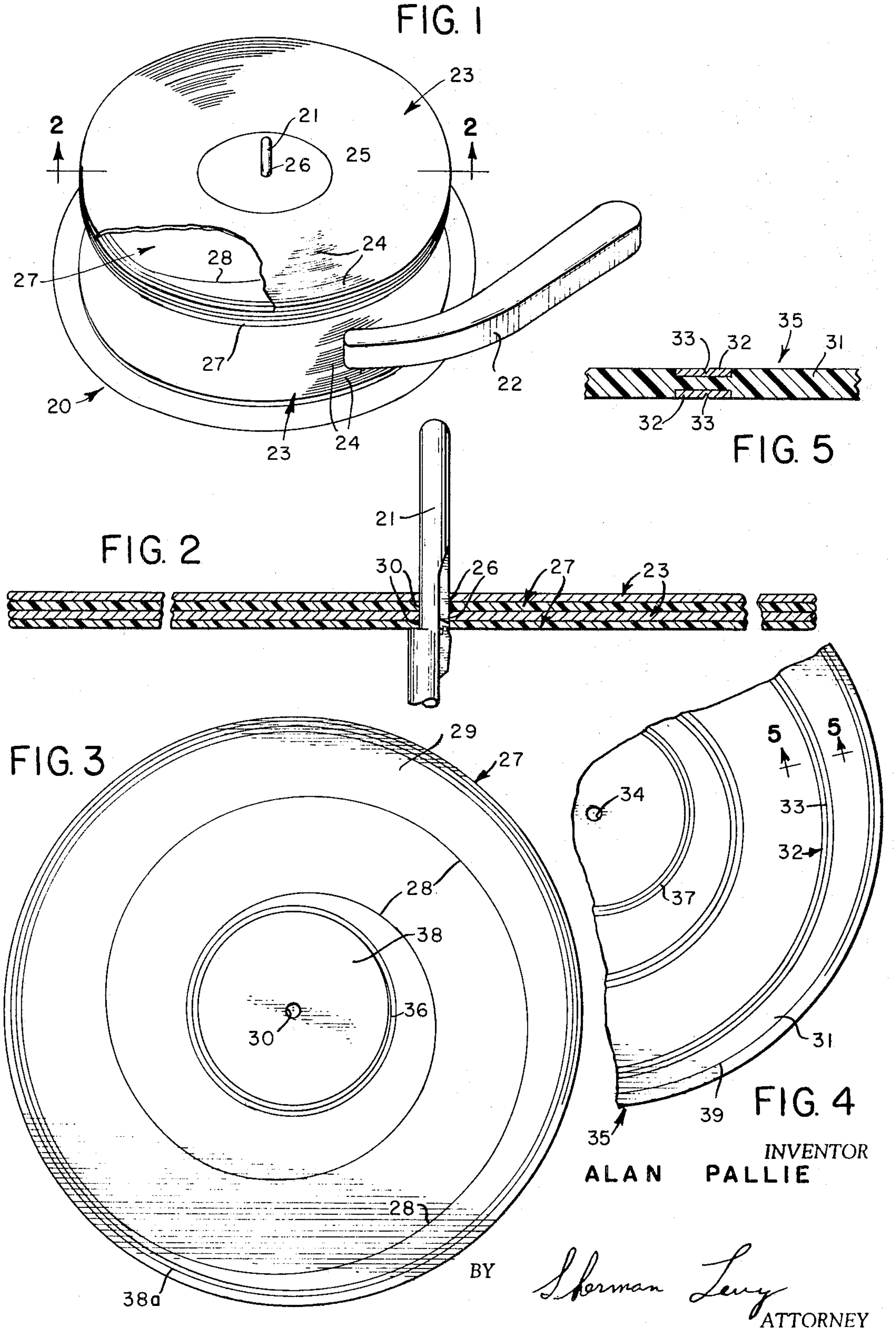
FIG. 1 is a perspective view with parts broken away and in section illustrating the present invention.
FIG. 2 is an enlarged sectional view taken on the line 2–2 of FIG. 1.
FIG. 3 is an enlarged plan view of one of the safety discs of the present invention showing the fast lead in groove.
FIG. 4 is a fragmentary plan view of a modified or alternative safety disc wherein the disc has a relatively hard insert with a groove therein, instead of making the entire disc of soft material such as a soft plastic material as shown in FIG. 1, 2 and 3.
FIG. 5 is an enlarged sectional view taken on the line 5–5 of FIG. 4.

Attention is directed to the drawings, and more particularly to FIGS. 1, 2 and 3 of the drawings, the numeral 20 indicates a portion of a conventional phonograph turntable that includes the usual spindle 21 and reproducing apparatus or arm 22. As shown in FIGS. 1 and 2, the numeral 23 indicates conventional phonograph records that have fine grooves 24 on the opposite sides thereof, and the records 23 have the usual circular inwardly disposed label 25 and center hole 26.

In accordance with the present invention, there is provided safety protective discs 27 which are adapted to be arranged between adjacent phonograph records such as the records 23. Each of the discs 27 has the same construction and each includes a main body portion 29 made of a material somewhat softer than the vinyl commonly used in the manufacture of phonograph records, and both sides of the safety discs 27 have a single fast silent lead in groove 28 of spiral formation formed therein. The discs 27 are further provided with center holes or openings 30 that are adapted to have projecting therethrough a portion of a spindle such as the spindle 21.

Referring now to FIG. 4 of the drawings, there is illustrated a portion of a modified safety disc which is indicated generally by the numeral 35, and the disc 35 includes a main body portion 31 of circular formation, and the body portion 31 may be made of a relatively soft material, and the body portion 31 may have a relatively hard plastic insert 32 positioned therein, and the insert 32 is provided with a single fast lead in spiral groove 33.

From the foregoing, it will be seen that there has been provided safety protective discs for phonograph records, and wherein the discs of the present invention will prevent valuable phonograph records from rubbing against each other or contacting each other so that such records will not be scratched or damaged. In use, with the parts arranged as shown in the drawings, one of the safety protective discs 27 of the present invention is adapted to be arranged or interposed between an adjacent pair of phonograph records 23, as shown in FIGS. 1 and 2. Because the discs 27 are made of a material somewhat softer than the vinyl commonly used in the manufacture of phonograph records, it will be seen that these discs will act as protective devices to maintain the records separated from each other. The discs 27 have the same shape and size as the regular records 23. However, the discs 27 have only a single fast silent lead in groove 28 instead of the plurality of fine grooves 24 that are provided in the conventional phonograph records 23. The discs 27 include the main body portion 29 made of a material somewhat softer than the vinyl commonly used in the manufacture of phonograph records and a groove such as the groove 28 is adapted to be provided on each of the sides of the disc 27. The discs 27 also have center holes 30 which coincide with the center holes 26 in the records 23 so that the spindle 21 can extend through these registering holes or openings as shown in FIG. 2.

The discs of the present invention can be made in sizes duplicating generally the records with which they are to be used. The discs 27 have sufficient thickness to prevent the records from making direct contact with each other. However, the discs will not interfere with the proper operation of the phonograph equipment. With the present invention, a plurality of phonograph records can be superimposed or arranged in stacked condition as shown in FIG. 1 without marring or damaging the fine grooves or other surfaces of the phonograph records. In FIG. 3 the numeral 36 indicates the circular reject portion of the disc 27. Similarly in FIG. 4 the numeral 37 indicates the reject portion of the disc 35. The safety discs of the present invention have the same dimensions as a standard record such as a standard 12-inch long-playing 33⅓ r.p.m. record. The center hole 30 may be .275 inches in diameter, and the discs 27 may have a thickness of .055 inches. The portion 38 may have a thickness of .055 inches. The portion 38 may be approximately 4 inches in diameter which is the same dimension or size as the identification label 25 of the conventional record 23. The discs are adapted to be made or formed with a distinctive color such as milky white so that they can be readily distinguished from the regular records, and the discs will not damage the stylus or needle.

It will therefore be seen that there has been provided protective accessories for phonograph records which are adapted to be used with standard 33⅓ r.p.m. record, and the discs can be used with any automatic record changers. The discs provide a safe means for handling or stacking records onto a record changer spindle as well as providing a safe means for removing the records from the record player spindle after the records have been played.

The discs prevent the possibility of damaging the records such as the records 23 because the records can be played and removed without contact with each other, thereby eliminating the possibility of the records rubbing or scratching together. One of the safety discs is adapted to be inserted between each pair of phonograph records when the records are placed initially on the turntable spindle or being stacked for that purpose. The size and configuration of the safety disc is exactly identical to the standard 33⅓ r.p.m. phonograph records. However, the safety discs 27 are made of a material such as plastic which is somewhat softer than the vinyl material that normal phonograph records are pressed from, and this softer plastic disc 27 may be made milk white in color to facilitate identification. The discs are softer to the touch but the discs are hard enough to lay flat and not warp, and hard enough to maintain the correct record-spindle and record-turntable relationship. Also, while the conventional phonograph records have grooves leading to the center of the record the safety discs of the present invention have only one fast silent groove 28 leading to the center of the disc which will allow the phonograph arm to quickly reach the center or reject portion 36 of the disc, and this permits the changer mechanism to drop the next normal record so that this can be played in the usual manner. This one groove 28 is of the same depth and shape as used as lead in grooves on regular records. With this construction the total elapsed time from the instant the phonograph arm comes down on the safety disc until the arm reaches the center or reject portion of the disc is no more than two or three revolutions of the turntable.

While the sophisticated phonograph record-playing equipment in existence is capable of automatically changing and playing as many as approximately 10 or 12 records, generally people who are operating this type of equipment are reluctant to stack one valuable record such as one stereo record on top of another for fear of scratching or rubbing the records together. Also, regardless of the type or record that is used extreme caution is necessary to prevent damage to the records, either in stacking the records on the changer or while removing the stack of records after the last record has finished playing. As a result, most audio fans only play one record at a time in spite of the fact that generally their equipment capabilities exceed this amount. The safety discs are made of a specially compounded recordlike material which is softer than phonograph record plastic and shaped exactly like a 33⅓ r.p.m. record, which is placed in between records when placing the records on the record changer spindle. Due to the fact that the safety stacks are of a softer material than the records it is impossible for the records to become scratched or rubbed from contacting each other.

The discs 27 have a normal lead in groove 38a adjacent the outer edge of the disc, and the discs 37 also have a groove 28 as previously stated. Similarly the disc 35 of FIG. 4 is adapted to have a normal lead in groove 39 adjacent the outer edge of the disc as well as the fast groove 33 in the insert 32.

The safety discs are in the form of dummy records placed between regular records so that in use the regular records will drop and the needle arm will move in and the record will play. When the record is completed the arm will move out. When the safety disc 27 drops, the arm 22 will move in and go down along the lead in groove 38a and will then be carried rapidly by the fast groove 28 into the center to the reject portion 36, and when the needle reaches the reject portion 36, the arm 22 will move outwardly so that another record will drop. Then this cycle of operation is repeated for the entire stack of records and discs.

In FIG. 4 the disc has a relatively hard insert 32 with the groove 33, and the remaining portion 30 of the disc 35 is of soft material such as soft plastic material.

Since the disc is the same size as the regular record the entire surface of the record will be protected and supported. In addition, the discs will function even though the records being played may be slightly worn. The discs are made of a material somewhat softer than the vinyl commonly used in the manufacture of phonograph records. The discs have only the single groove 28 leading to the center so as to allow the rejection mechanism to function, and the total elapsed time for this action to take place only corresponds to about two or three revolutions of the turntable.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

I claim:

1. A safety protective disc for phonograph records wherein the disc has the same size and shape as regular phonograph records, said disc adapted to be positioned between adjacent pairs of phonograph records, said disc being made of a material that is somewhat softer than the material commonly used in the manufacture of phonograph records, both sides of said disc having a normal lead in groove adjacent the outer edge thereof, and both sides of said disc having a fast groove of spiral formation and configuration.